United States Patent
Koch

[11] Patent Number: 6,162,478
[45] Date of Patent: Dec. 19, 2000

[54] METHOD AND DEVICE FOR PREPARING CHICKEN EGGS

[76] Inventor: Otto Koch, Eschenriederstrasse 47, Groebenzell, Germany, D-82194

[21] Appl. No.: 09/147,525
[22] PCT Filed: Jul. 11, 1997
[86] PCT No.: PCT/EP97/03705
    § 371 Date: Mar. 15, 1999
    § 102(e) Date: Mar. 15, 1999
[87] PCT Pub. No.: WO98/02073
    PCT Pub. Date: Jan. 22, 1998

[30] Foreign Application Priority Data

Jul. 15, 1996 [DE] Germany .......................... 196 28 468

[51] Int. Cl.⁷ ......................................................... A23B 5/00
[52] U.S. Cl. ........................... 426/298; 426/300; 426/506; 426/509; 99/334; 99/335; 99/336; 99/403
[58] Field of Search .............................. 99/334, 335, 336, 99/403; 426/298, 300, 506, 509

[56] References Cited

U.S. PATENT DOCUMENTS

| 5,589,211 | 12/1996 | Cox et al. ................................. 426/298 |
| 5,843,505 | 12/1998 | Davidson ................................. 426/298 |

FOREIGN PATENT DOCUMENTS

| 26 33 630 | 2/1978 | Germany . |
| 28 05 373 | 8/1979 | Germany . |
| 31 23 881 | 12/1982 | Germany . |
| 36 01 406 | 7/1987 | Germany . |
| 95/14388 | 6/1995 | WIPO . |

*Primary Examiner*—Milton Cano
*Attorney, Agent, or Firm*—Jacobson, Price, Holman & Stern, PLLC

[57] ABSTRACT

The invention relates to a process for preparation of hen's eggs during which the eggs are put into a cooking chamber of an egg-cooking container (2) closeable by a cover (8), which chamber contains a liquid heat-supplying medium, preferably water. The preparation temperature during a first preparation stage is below the boiling temperature of the water, and during a following second preparation stage is held below the temperature of the first preparation stage but above 55° C. During the first preparation stage, the water starts at a temperature of approx. 55° C. and is heated at a high heating rate to a temperature of at least 90° C. during a first period with the result that the eggs rapidly reach a core temperature of approx. 58° to 75° C. At the start of the second preparation stage, the water temperature is reduced at a high cooling rate to a final temperature of between 80° C. and 55° C. The eggs are cooked at this final temperature for a predetermined second period to destroy remaining salmonella The cover (8) is opened automatically to remove the eggs not until after the end of the second period.

20 Claims, 1 Drawing Sheet

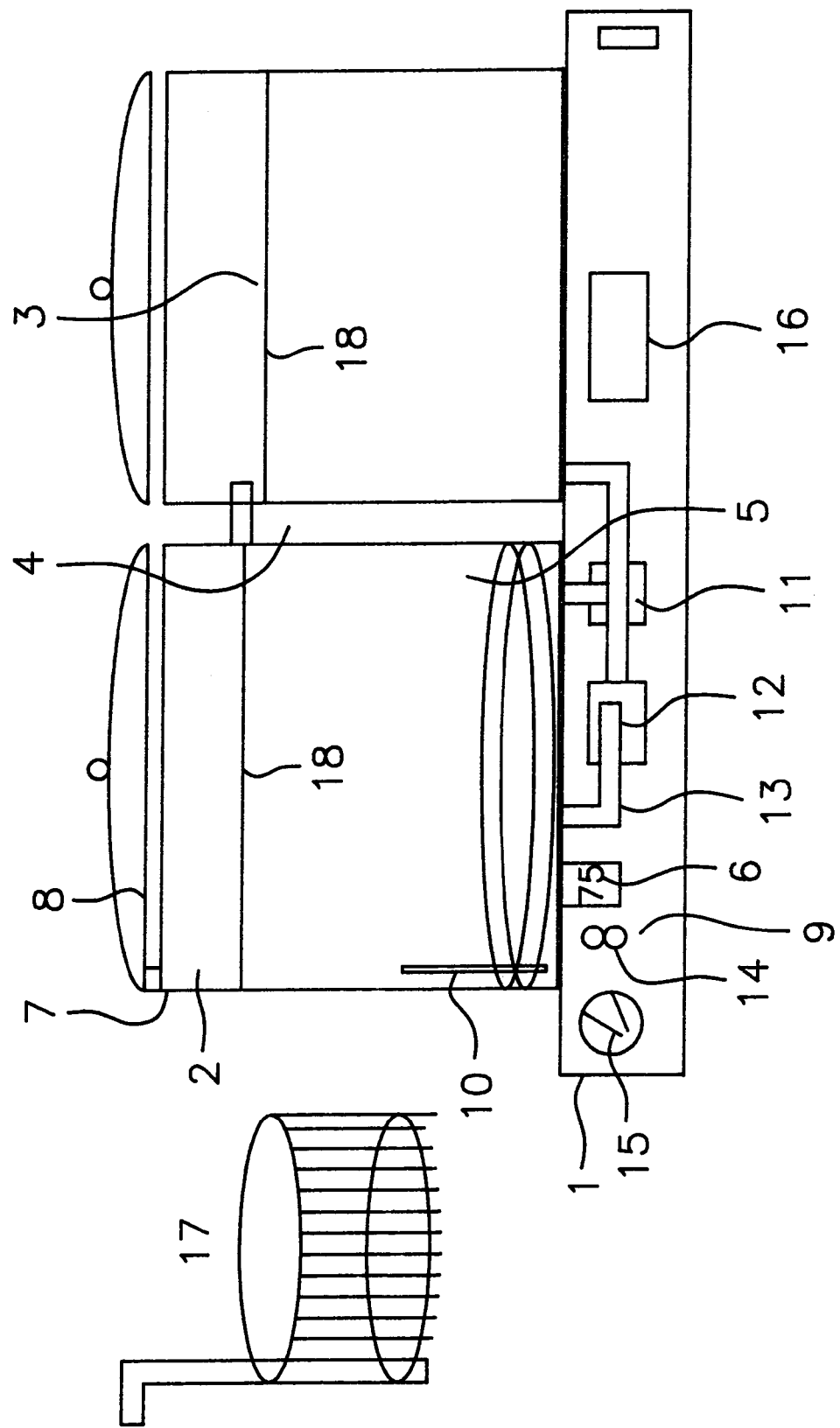

METHOD AND DEVICE FOR PREPARING CHICKEN EGGS

This application is 371 of PCT/EP97/03705 filed Jul. 11, 1997.

BACKGROUND OF THE INVENTION

1. Field of the Invention

The invention relates to a device for the preparation of chicken eggs.

2 Description of the Related Art

The increasing risk of salmonella and the ISO standard 9002, as well as the HACCP (the new European hygiene law), no longer permit the classical method of preparing eggs (as a soft boiled breakfast egg), in particular in the hotel and restaurant trade due to the product liability of the operators.

To guarantee the destruction of salmonella, the customary preparation of eggs recommends cooking the breakfast eggs for at least twenty minutes in boiling water. However, after this treatment the eggs exhibit a distinct hard consistency, are bad to eat, difficult to digest and dry and thus intolerable in turn to good health.

The DE 31 23 881 A1 discloses a process of the aforementioned type, which is supposed to have a positive effect on the quality of the prepared egg, since the eggs are cooked by means of a main heating circuit at a preparation temperature that is below the boiling point of water. If desired, the eggs may be kept warm by means of an additional heating circuit of lower thermal output.

Irrespective of the fact that the said publication does not even mention the salmonella problem, the process disclosed therein cannot guarantee the mandatory reliable destruction of salmonella because the preparation temperature that is applied ranges only from 65° to 85° C. and the subsequent heat retaining temperature is only above 60° C. Yet the reliable destruction of salmonella requires that the entire egg, i.e. also the central core region, be heated to at least 55° to 80° C. for at least ten minutes.

The DE 2633630 A1 also discloses the preparation of eggs at temperatures below the boiling point of water and a subsequent servable heat holding. This document, too, does not deal in any way with the risk of salmonella. Since for the preparation only a water temperature above 70° C. and a subsequent heat holding temperature ranging from 50° to 60° C. is disclosed, this preparation method, too, cannot guarantee the complete destruction of salmonella by attaining the requisite temperature, especially in the egg's core region, which warms up more slowly, for at least ten minutes.

Finally the DE 3601406 A1 discloses a process for cooking chicken eggs, in which to avoid an infection with pathogens adhering in particular to the egg shell, the content of the eggs is transferred in the uncooked, raw state into a closable container; and the egg content is cooked in this container so that the egg shell does not make any contact at all with the cooking water.

Apart from the fact that with this barely practical method pathogens can still come into contact with the egg content when the egg content is separated from the shell, the salmonellae that already existed in the egg substance cannot be rendered harmless by the subsequent customary cooking process.

The document WO-A-9514388 discloses a process, in which for a salmonella-free preparation chicken eggs are heated to over 90° C. during a first preparation phase and thereafter are cooled during a second preparation phase and then held at a pasteurization temperature ranging from 55° C. to 60° C.

The DE-A-2805373 discloses an egg cooker, which exhibits an electrically heated cooking container, which can be closed with a lid and in which the eggs are cooked by means of water or water vapor. Following passage of the cooking period, the eggs are quenched with cold water, which is taken from a water container above the cooking container, and following quenching leaves the cooking container through a drain. In so doing, salmonella-free preparation is not a factor.

SUMMARY OF THE INVENTION

Therefore, the invention is based on the problem of providing a device for the preparation of chicken eggs, whose results guarantee with certainty prepared eggs that are free of salmonella while at the same time avoiding the said drawbacks of the aforementioned prior art. In addition, the eggs shall exhibit, as the consumer desires especially for breakfast eggs, the following consistency: with an adequately solid, but not hard rim of egg white and an internally still soft egg yolk, so that excellent tolerability can be guaranteed and the pleasure is equivalent to breakfast eggs prepared in the traditional manner.

This problem is solved by means of a device for the preparation of chicken eggs, in which the eggs are put into a cooking chamber, which contains a liquid heat supplying medium, preferably water, and belongs to an egg cooking container. The preparation temperature during a first preparation phase is below the boiling temperature of the water during a first period of time, and during a following second preparation phase is held below the temperature of the first preparation phase at an end temperature during a second period of time. According to the invention, the egg cooking container is a heatable, thermostat-regulated container, which is intended to hold cooking water and the eggs and which is connected to a reserve water container for cold water by way of a water overflow. After heating the cooking water up to at least 90° C. during the first preparation phase and after the end of the first period of time, a pump conveys so much cold water continuously by means of a valve from the reserve water container into the egg cooking container that the result is the end temperature in the egg cooking container.

One special advantage of the invention lies in the fact that at the temperature of the second preparation phase the eggs retain their described consistency during subsequent storage without becoming hard. Thus, the eggs can also be stored in a pot and be kept warm and servable for several hours, a feature that is especially important in the hotel and restaurant trade. It is advantageous to open the lid of the egg cooking container only after one is certain that the salmonella bacteria have been killed so that the eggs cannot be removed beforehand.

According to advantageous embodiments of the invention, a circulation of the cooking water of the egg cooking container may be provided over the valve by means of the pump, and/or an agitator may be provided to circulate the cooking water. The egg cooking container may be further equipped with a temperature sensor and a thermostat. A signaling device may be used to indicate the completion of the second period of time, and a switch may be included to control the length of the first period as a function of the egg size. In a preferred embodiment, the egg cooking container is provided with a closable lid, whose locking mechanism can be released automatically by the signaling device upon reaching the end temperature and following completion of the second period. For continuous egg preparation, a second egg cooking container may be connected to the reserve water container. During the first preparation phase in accordance with a preferred embodiment, a water temperature of at least 90° C., and preferably 95° C., is reached from a starting temperature of at least approximately 55° C.; the end temperature ranges from 58° C. to 62° C. and the second period is at least approximately 10 minutes.

BRIEF DESCRIPTION OF THE DRAWINGS

One embodiment of the invention shall be explained in detail with reference to the schematic drawing in the following. The FIGURE shows an embodiment of the inventive device for the preparation of chicken eggs.

DETAILED DESCRIPTION OF THE PREFERRED EMBODIMENTS

The egg cooker, depicted in the drawing, has a housing base, called the console 1 in the following, on which an egg cooking container 2 and a reserve water container 3 are set. Both containers 2, 3 are designed preferably as CN pots and connected together at a height of approx. 15 cm above a pipe 4, which acts as the water overflow. The egg cooking container 2 is equipped with heating coils 5 (not illustrated) for the purpose of a thermostat-regulated heating of the pot in three steps with at least 2,000 watts and with a temperature sensor 10 for a digital temperature indicator 6, which is integrated into the console 1. Furthermore, the egg cooking container 2 is provided with a lid 8, which can be closed with its own, preferably electromagnetic locking mechanism 7.

Subsequently the valve 11 is switched again in such a manner that the pump circulates the cooking water in the container 2. In so doing, the water temperature (60° C.±2° C.) is constantly controlled. When the temperature drops below 58° C., the thermostat starts and the heating rods 5 heat up the water again to 60° C. The eggs are cooked a second period, preferably for 10 minutes, starting from the instant, at which the mixing temperature of 60° C. is reached. Then the eggs are ready to eat. Simultaneously the bell rings, and the signalling device 9 changes from a red to a green signal light 14. At the same time the locking mechanism 7 of the lid 8 is also released so that the finished eggs can be removed.

Now the eggs are adequately solid on the outside and yet soft on the inside and in addition positively free of salmonella. The eggs can now be stored, if desired, in the cooking container 2 at the constant water temperature of 60° C. without any reservations that their consistency will change noticeably in the coming hours, a feature that is of significant advantage, especially in the hotel and restaurant trade, because the eggs are constantly servable and can be consumed immediately.

The invention can also be applied to automatic heaters, which work so as to be air-tight in a vacuum, e.g. to the preparation of scrambled eggs (in a warm dispenser, or vacuum prepared in a bag and regenerated only in a water bath at 60°).

It is also possible to use, instead of the illustrated arrangement with a pump and a 3/2 way valve, two separate pumps, of which the one pump provides for the transport of the cold water into the egg cooking container 2 and the other pump provides only for the circulation of the cooking water in the egg cooking container 2.

To circulate the cooking water a separate agitator can also be provided as an alternative or addition.

To control the length of both preparation phases, especially the cooking periods as a function of the size of the eggs, the console has a switch 15, with which the size of the eggs can be set. Furthermore, the console 1 includes a control element 16, which is depicted schematicly and which processes the temperature signal of the temperature sensor 10 in the container 2 and which controls the entire sequence of the heating process and also the water circulation by means of the valve 11.

At the start of the cooking process the egg cooking container 2 and the reserve water container 3 are to be filled with the specified quantity of water. The desired quantity of eggs is put into the basket 17, provided therefor, and said basket is put into the egg cooking container 2. Then the eggs displace the water from the container 2 through the overflow 4 into the container 3 in proportion to their mass. In this manner the goal is reached in an advantageous manner that the introduced quantity of energy remains constant independently of the quantity of eggs. Then the size of the eggs must be set with the switch 15, e.g. step 2 for eggs of size 2. In this manner the cooking process, which runs completely automatically via the control element 16, is started, whereby the heat 5 is switched on and the pump 12, which runs continuously, is put into motion. By continuously swirling the water, the pump 12 provides that when heating the water and subsequently holding the temperature of the water constant the temperature is the same everywhere in the cooking container 2. Furthermore, at the start of the process, the red lamp of the signalling device 9 glows in order to indicate that the cooking process has not ended yet. At the same time the locking mechanism 7 of the lid 8 is activated, so that neither additional eggs can be added subsequently nor can the eggs be removed prematurely.

Upon reaching a water temperature of approx. 55° C., at which the eggs begin to cook, a clock, which is connected to the switch 15 for the egg size, is turned on and controlled by the temperature signal of the temperature sensor. Upon reaching the requisite water temperature of 90°–95° C. (at which the heat energy supply is throttled in such a manner that this temperature is held), the clock runs for a specified first period of time as a function of the egg size, for example 5.5 minutes for eggs of class 2. During the entire heating and temperature holding process, the pump 12 circulates continuously the water in the container 2 and thus holds said water in motion. To this end the valve 11 is switched in such a manner that the water cannot flow from container 3 into container 2.

Following termination of the temperature holding process, whose duration is dependent on the egg size—in the present case after 5.5 minutes (first period)—the heat is turned off. Simultaneously the valve 11 is switched in such a manner that the pump 12 conveys now cold water from the reserve water container 3 into the cooking container 2 until there a mixing temperature of 80° C. to 55° C., preferably 60° C.±2° C., is reached. The excess water produced in the cooking container 2 due to the pumping in of cold water flows thereby through the water overflow 4 back into the reserve water container 3.

Subsequently the valve 11 is switched again in such a manner that the pump circulates the cooking water in the container 2. In so doing, the water temperature (60° C.±2° C.) is constantly controlled. When the temperature drops below 58° C., the thermostat starts and the heating rods 5 heat up the water again to 60° C. The eggs are cooked a second period, preferably for 10 minutes, starting from the instant, at which the mixing temperature of 60° C. is reached. Then the eggs are ready to eat. Simultaneously the bell rings, and the signalling device 9 changes from a red to a green signal light 14. At the same time the locking mechanism 7 of the lid 8 is also released so that the finished eggs can be removed.

Now the eggs are adequately solid on the outside and yet soft on the inside and in addition positively free of salmonella. The eggs can now be stored, if desired, in the cooking container 2 at the constant water temperature of 60° C. without any reservations that their consistency will change noticeably in the coming hours, a feature that is of significant advantage, especially in the hotel and restaurant trade, because the eggs are constantly servable and can be consumed immediately.

The process according to the invention can also be applied to automatic heaters, e.g. for the preparation of scrambled eggs (in a warm dispenser, or vacuum prepared in a bag and regenerated only in a water bath at 60°).

LIST OF REFERENCE NUMERALS 1 console
2 egg cooking container
3 reserve water container
4 water overflow
5 heating coils
6 temperature indicator
7 locking mechanism
8 lid
9 signalling device
10 temperature sensor, thermostat
11 valve
12 water pump
13 pipeline
14 green signal light
15 egg size/start switch
16 control element
17 wire basket
18 water level

What is claimed is:

1. A device for preparation of chicken eggs, in which the eggs are put into a cooking chamber, which contains a liquid heat supplying medium, wherein a preparation temperature during a first preparation phase is below a boiling temperature of the medium during a first period of time, and during a following second preparation phase is held below the preparation temperature of the first preparation phase at an end temperature during a second period of time, said device comprising a heatable, thermostat-regulated egg cooking container for holding the medium and the eggs and which is connected to a reserve medium container for cold medium by way of an overflow, and a pump for conveying cold medium continuously by means of a valve from the reserve medium container into the egg cooking container after the medium has been heated up to at least 90° C. during the first preparation phase and after the end of the first period of time so that the end temperature is held in said egg cooking container during the second period of time.

2. The device as set forth in claim 1, wherein the pump provides circulation of the medium within the egg cooking container.

3. The device as set forth in claim 1, wherein an agitator is provided to circulate the medium.

4. The device as set forth in claim 1, wherein the egg cooking container is equipped with a temperature sensor and a thermostat.

5. The device as set forth in claim 1, further comprising a signalling device to indicate completion of the second period of time.

6. The device as set forth in claim 5, wherein the egg cooking container is provided with a closable lid having a locking mechanism that can be released automatically by the signalling device upon reaching the end temperature and following completion of the second period of time.

7. The device as set forth in claim 1, further comprising a switch to control a length of the first period as a function of egg size.

8. The device as set forth in claim 1, further comprising a second egg cooking container, which is connected to the reserve medium container, for continuous egg preparation.

9. The device as set forth in claim 1, wherein during the first preparation phase a preparation temperature of at least 90° C., starting from a starting temperature of at least approximately 55° C., is reached.

10. The device as set forth in claim 9, wherein the preparation temperature during the first preparation phase is approximately 95° C.

11. The device as set forth in claim 1, wherein the end temperature ranges from 55° C. to 80° C.

12. The device as set forth in claim 11, wherein the end temperature is 60° C.±2° C.

13. The device as set forth in claim 1, wherein the second period is at least approximately 10 minutes.

14. A device for preparing chicken eggs according to a first preparation phase and a second preparation phase, comprising:
    a heatable, thermostat-regulated egg cooking container for holding a liquid heat supplying medium and the eggs;
    a reserve liquid medium container in communication with said egg cooking container by way of a liquid medium overflow, said reserve liquid medium container holding liquid medium at a cooler temperature than said liquid heat supplying medium; and
    a pump for delivering liquid medium from said reserve liquid medium container to said egg cooking container during the second preparation phase;
    said egg cooking container heating the liquid heat supplying medium to a preparation temperature during the first preparation phase for a first period of time, said preparation temperature being less than a boiling temperature of said liquid heat supplying medium, and said pump, after the first period of time, delivering liquid medium from said reserve liquid medium container to said egg cooking container in such a quantity that a final temperature is produced, said final temperature being less than the preparation temperature and maintained for a second period of time.

15. The device as set forth in claim 14, the liquid heat supplying medium and the liquid medium in the reserve liquid medium container being water, the preparation temperature being at least 90° C. and the final temperature ranging from 58° C. to 62° C.

16. The device as set forth in claim 15 wherein the preparation temperature is approximately 95° C.

17. The device as set forth in claim 14, wherein the second period of time is approximately 10 minutes.

18. The device as set forth in claim 14, further comprising a switch for controlling a length of the first period of time as a function of egg size.

19. A method for preparing chicken eggs according to a first preparation phase and a second preparation phase in which the eggs are put into a heatable, thermostat-regulated cooking container containing a liquid heat supplying medium, the cooking container in communication with a reserve liquid medium container containing liquid medium at a cooler temperature than said liquid heat supplying medium, said method comprising the steps of:

heating the liquid heat supplying medium to a preparation temperature during the first preparation phase, the preparation temperature being less than a boiling temperature of said liquid heat supplying medium;

maintaining the preparation temperature for a first period of time;

delivering during the second preparation phase liquid medium from said reserve liquid medium container to said egg cooking container in such a quantity that a final liquid medium temperature is produced, the final temperature being less than the preparation temperature; and maintaining the final temperature for a second period of time.

20. The method as set forth in claim 19, wherein the liquid heat supplying medium and the liquid medium in the reserve liquid medium container are water, the final temperature ranges from 58° C. to 62° C., and the step of heating includes heating the water in the cooking container from a starting temperature of approximately 55° C. to a preparation temperature of at least 90° C.

* * * * *